United States Patent [19]

Holston et al.

[11] 4,408,150
[45] Oct. 4, 1983

[54] SPEED CONTROL SYSTEM AND METHOD FOR ELECTRIC MOTOR

[75] Inventors: Roger W. Holston; Carl P. Hinesley, both of St. Louis, Mo.

[73] Assignee: Emerson Electric Co., St. Louis, Mo.

[21] Appl. No.: 332,879

[22] Filed: Dec. 21, 1981

Related U.S. Application Data

[63] Continuation of Ser. No. 151,679, May 20, 1980, abandoned.

[51] Int. Cl.³ .............................................. H02P 5/28
[52] U.S. Cl. .................................. 318/779; 318/729; 318/817; 318/438
[58] Field of Search .............. 318/779, 729, 772, 774, 318/794, 795, 816, 817, 775–777, 521–529, 352–354, 305, 508–510, 438; 310/184, 189

[56] References Cited

U.S. PATENT DOCUMENTS

| 850,203 | 4/1907 | Barker | 318/781 |
|---|---|---|---|
| 1,726,231 | 8/1929 | Kennedy | 318/779 |
| 1,783,175 | 12/1930 | Jordan | 318/305 |
| 1,978,581 | 10/1934 | Johnson | 318/817 |
| 2,120,321 | 6/1938 | Bargdill | 318/794 |
| 2,648,808 | 8/1953 | Tiede | 318/510 |
| 4,119,894 | 10/1978 | Sorensen | 318/783 |

FOREIGN PATENT DOCUMENTS

| 222512 | 10/1958 | Australia | 318/729 |
|---|---|---|---|
| 365605 | 1/1932 | United Kingdom | 318/729 |

Primary Examiner—David Smith, Jr.
Attorney, Agent, or Firm—Polster, Polster and Lucchesi

[57] ABSTRACT

A speed control for an electric motor comprising a capacitor interconnected in series with the main windings of the motor and a multi-position speed selector switch for selectively energizing one or more series connected main windings of the motor and, in a slow speed mode of operation, for serially connecting the capacitor to the series connected main windings so that the motor operates at a slower speed.

A method of speed control for an electric motor is also disclosed.

15 Claims, 4 Drawing Figures

SPEED CONTROL SYSTEM AND METHOD FOR ELECTRIC MOTOR

This is a continuation of application Ser. No. 151,679, filed May 20, 1980, now abandoned.

BACKGROUND OF THE INVENTION

This invention relates to an induction electric motor, and more specifically to a means and a method which may be readily used with the motor so as to result in operation of the motor at a speed slower than its normal of operational speed.

In such applications as in a ceiling-mounted fan or the like, a single or multi-speed motor is typically provided for driving the fan. However, in many instances, it would be desirable to provide another speed of operation for the fan motor even slower than its normal low speed mode of operation. Typically, this is accomplished by replacing a single speed motor with a multi-speed motor, or by replacing a two-speed motor with a three-speed motor. These multi-speed motors oftentimes have different sets of main windings each having different number of poles in each set of windings which may be energized for high, low, or intermediate speed operation. For example, a two-speed motor may be provided having a low speed set of windings including a four poles and a high speed set of windings including two poles. Typically, a selector switch is connected to the lead wires to the motor windings for selective energization for either the high speed or low speed poles of the motor. Of course, it will be appreciated that by providing additional sets of windings or by selective energization of the various coils in the windings, many more speeds of operation of the motor may result. However, it is usually more expensive to provide an additional set of windings in the motor as these additional windings require more materials to construct, take up more space within the motor, and are more difficult to insert in the stator core of the motor.

In a multi-winding motor, the motor generally exhibits its higher starting torque capability when started in its high speed mode of operation. In certain motor applications requiring good starting torque, a multi-speed motor may not have sufficient torque for start up purposes unless it is started in its higher speed modes of operation.

Alternatively, another method of speed control is to place an inductance in series with the main windings of the motor so that with the load current flowing through the main windings and the inductance the inductance will cause the motor to operate at a slower speed. Such a voltage reduction speed control is shown in U.S. Pat. No. 850,203. However, while such a voltage controlling speed control may be relatively simple, and may be "added on" to the motor, it results in significant heat losses. Also, such a voltage reduction speed controller means that when the inductance is connected to the main windings, the motor may not have sufficient starting torque. As is disclosed above-noted U.S. Pat. No. 850,203, a centrifugally responsive switch may be provided to disconnect the resistance from the winding during start-up and to reconnect the resistance to the windings only after the motor has accelerated to a predetermined speed. However, in many motor applications, there may not be sufficient space within the motor to use the centrifugal switch approach and the centrifugal switch adds to the complexity and the cost of the motor.

Among the several objects and features of the present invention may be noted the provision of speed control means which may readily be incorporated with a motor so as to result in the selected operation of the motor at a slower speed;

The provision of such a speed control means which is of relatively compact size;

The provision of such a speed control means switch may be "added on" to the motor wiring externally of the motor;

The provision of such a means and method of speed control which does not generate an appreciable amount of heat and thus which is energy efficient;

The provision of such speed control means which, in one embodiment thereof, does not adversely affect the starting torque characteristics of the motor even when the motor is set for slow speed operation; and The provision of such speed control means which is of low cost construction and which is reliable in operation.

Other objects of this invention will be in part apparent and in part pointed out hereinafter.

SUMMARY OF THE INVENTION

In an electric motor having at least one main winding, a multiple position speed selector switch is provided for selecting the speed of operation of said motor. The present invention involves means connected in series to the main winding and being energizable by said speed selector switch together with said main winding thereby to energize both the main winding and this last-said means so as to result in the operation of the motor at a speed slower than the operational speed of the motor without said speed control means connected thereto.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
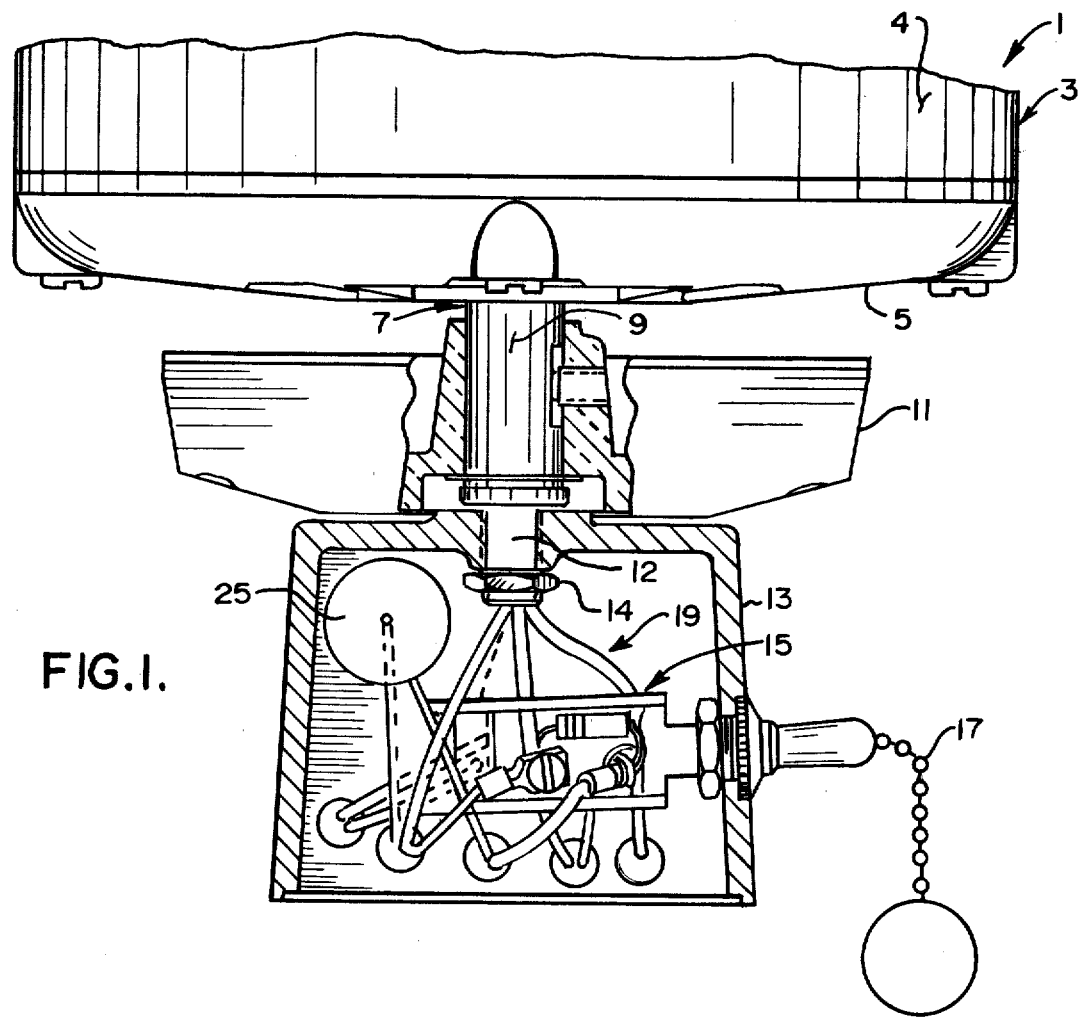
FIG. 1 is a partial cross-sectional view of a portion of a ceiling mounted electric fan motor illustrating a fan blade hub mounted on the rotor shaft of the motor with a switch housing stationarily supported on the end of the rotor shaft with a multi-position speed selector switch housed therein.

Referring now to the drawings, an electric motor for a ceiling mounted fan or the like is indicated in its entirety by reference character 1. Motor 1 is shown to comprise a stator assembly 3 including a shell or housing 4 with an end shield 5 at the outer end of the shell. A rotor assembly, as generally indicated at 7, is rotatable within the stator and is journalled by bearings (not shown) carried by the end shield. The rotor assembly includes a rotor shaft 9 which extends endwise out beyond end shield 5 and which carries a hub 11 for rotation with the rotor shaft. In the application illustrated herein, motor 1 is a fan motor and it will be understood that fan blades (not shown) may be mounted on the hub 11 for rotation therewith.

Rotor shaft 9 is shown to be hollow and a tubular wire raceway 12 is provided within the rotor shaft. The rotor shaft is free to rotate relative to the wire raceway. The latter has a switch enclosure or housing 13 secured on the outer end thereof below fan blade hub 11. Switch housing 13 is stationarily mounted on the end of raceway 12 by means of a nut 14. A multiple position speed selector switch, as generally indicated at 15, is stationarily mounted within housing 13. This speed selector switch may be a multi-position ratchet-type rotary switch selectively acutated by a chain pull 17 or the like. It will be understood that within the broader aspects of this invention, the construction and operation of the speed selector switch, does not per se, constitute a part of the invention. Hence, a detailed description of the construction and operation of switch 15 is not necessary.

Figures 2, 3, 4:
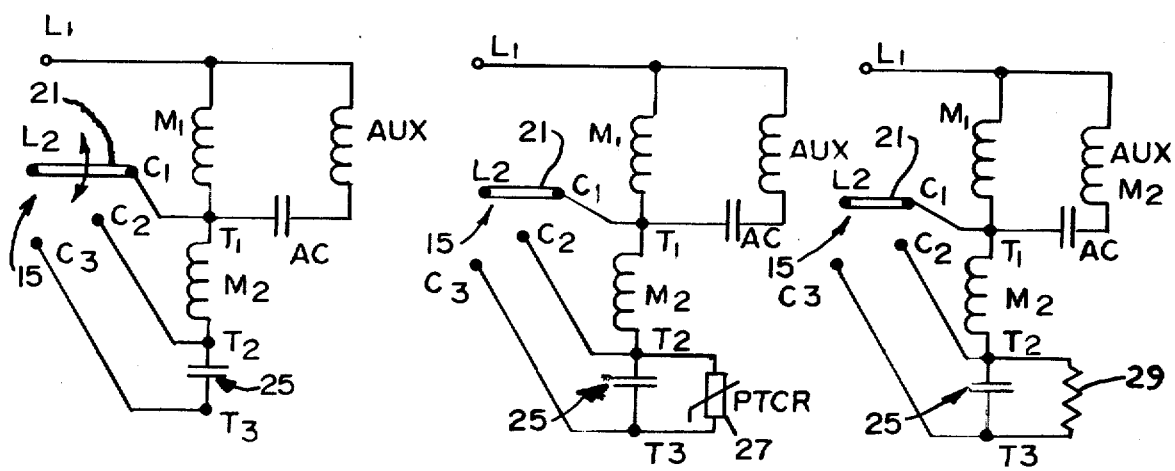
FIGS. 2–4 are schematic diagrams illustrating various embodiments of motor speed control of the present invention.

A plurality of electrical leads, as generally indicated at 19, to and from motor 1 passes down through wire raceway 12 into switch housing 13 for connection to various terminals of the multiple position speed selector switch 15. As shown in FIGS. 2–4, speed selector switch 15 has a selectively movable switch member 21 for making electrical contact with various contacts $C_1$–$C_3$ within the switch thereby to initiate operation of the motor at a preselected speed. Of course, switch 15 may also be utilized to energize and de-energize the motor in a manner well known to those skilled in the art.

Referring now to FIG. 2, the stator of motor 1 is shown to include a first main winding, as indicated at $M_1$, and a second main winding $M_2$ incorporated in the stator assembly 3 of the motor. Additionally, an auxiliary or starting winding, as generally indicated at AUX, is provided. Winding $M_1$ is herein referred to as the high speed winding of the motor and winding $M_2$ is referred to as the low speed winding of the motor. As is conventional, in a permanent split capacitor type motor, a capacitor AC is connected between main winding $M_1$ and coil AUX to provide a phase shift necessary for starting. This capacitor is energized continuously during operation of the motor. A first tap, as indicated at $T_1$, is provided between the series connected main windings $M_1$ and $M_2$. A second tap $T_2$ is provided on the side of the second main winding opposite from main winding $M_1$. These taps are interconnected by respective leads to respective contacts $C_1$ and $C_2$ located within speed selector switch 15. With movable switch member 21 in position to make electrical contact with contact $C_1$, line voltage, as between power input leads $L_1$ and $L_2$, is placed across main winding $M_1$ and thus the motor will operate in its high speed mode of operation. By selectively moving switch member to be in contact with contact $C_2$, both the serially connected main windings $M_1$ and $M_2$ will be energized across the power input lines and thus the motor will operate in its low speed mode of operation. As above-described, the motor and the speed control are substantially conventional.

In accordance with this invention, a capacitor, as generally indicated at 25, is serially connected to the second main winding $M_2$ on the side of the second winding opposite from its connection to main winding $M_1$. A third tap $T_3$ is provided on the side of capacitor 25 opposite main winding $M_2$. In other words, capacitor 25 is connected between taps $T_2$ and $T_3$. This capacitor 25 is interconnected to a third contact $C_3$ within speed selector switch 15 by a suitable lead from tap $T_3$. Thus, in accordance with this invention, upon moving movable switch element 21 to make contact with contact $C_3$, line voltage is applied to the serially connecting main windings $M_1$ and $M_2$ and through capacitor 25 in series with the main windings. Thus, capacitor 25 will cause the motor to operate at a speed lower than the speed at which the motor would operate even in its low speed mode of operation (i.e., with both main windings $M_1$ and $M_2$ energized).

Referring now to FIG. 3, another embodiment of the apparatus of the present invention is illustrated. In essence, the construction of motor 1 and the speed control means of the present invention incorporating capacitor 25 is essentially identical as disclosed above. However, a variable resistance incipient shunt 27 is connected in parallel with capacitor 25 between tap $T_2$ and $T_3$. This shunt resistance is shown to be a positive temperature coefficient resistor, preferably a thermistor. With movable switch element 21 of switch 15 in contact with contact $C_3$ and with the motor initially de-energized, the resistance of shunt resistor 27 will initially be quite low thereby to essentially shunt capacitor 25 from the circuit. Initially, substantially all of the line current will flow through main windings $M_1$ and $M_2$ and through the shunt resistor. Thus, the motor will start as if capacitor 25 were not in the circuit. This ensures that capacitor 25 does not adversely affect the starting torque characteristics of the motor. After the passage of a small increment of time during which time the motor accelerates to a desired speed, the positive temperature coefficient shunt resistor 27 self heats due to the flow of current therethrough and substantially increases its resistance to the flow of current therethrough. In its normal energized state, shunt resistor 27 has a relatively high resistance value and thus has little or no effect on capacitor 25. Thus, capacitor C, after initial energization of the motor, will control the speed of operation of the motor to its intended slow speed mode of operation. It will further be appreciated that upon shut-down of the motor and upon cooling of thermistor 27, the thermistor will act as a bleed resistor so as to discharge capacitor 25 when the motor is not in operation.

Referring now to FIG. 4, still another variation of the speed control system of the present invention is illustrated. Again, motor 1 is essentially the same as heretofor described with capacitor 25 serially connected to the low speed windings $M_2$. However, in place of the shunt resistor 27 described in regard to the FIG. 3, a bleed resistor, as indicated at 29, is connected in parallel to capacitor 25. In operation, bleed resistor 29 has little or no effect on the operating speed of the motor, but upon shut-down of the motor, the bleed resistor will allow the charge on capacitor 25 to dissipate.

As shown in FIG. 1, speed control means of this invention (i.e., capacitor 25 and shunt resistor 27 or bleed resistor 29) may be externally connected to the motor. The capacitor and the shunt resistor are shown to be connected to appropriate terminals of switch 15 and thus may readily be "added-on" to the motor externally of the motor.

EXAMPLE

For example, in a one/twenty-fifth horsepower permanent split capacitor 18 pole, a five microfarad capacitor 25 was connected in series with the low speed winding $M_2$, such as illustrated in FIG. 4. Bleed resistor 29 was specified to have a value of approximately 220,000 ohms. When connected to suitable source of electric power, the motor had a high speed mode of operation of approximately 170 RPM. Upon moving the speed selector switch movable element 21 to contact C₂ for energization of both the high and low speed windings M₁ and M₂, the motor had an operational speed of approximately 125 RPM. When speed selector switch movable element 21 was moved to contact C₃ thereby to energize the serially connected main windings and speed control capacitor 25, the motor was observed to have a low speed mode of operation of approximately 40 to 50 RPMs.

In view of the above, it will be seen that the several objects and features of this invention are achieved and other advantageous results obtained.

As various changes could be made in the above constructions and methods without departing from the scope of the invention, it is intended that all matter contained in the above description or shown in the accompanying drawing shall be interpreted as illustrative and not in a limiting sense.

What is claimed is:

1. In an electric motor having at least one main winding, a multi-position speed selector switch for energization of the main winding of operation of the motor at high speed and one or more slower speeds, said motor being adapted to be connected to a source of line voltage, wherein the improvement comprises: capacitor means connected in series with one of said at least one main windings and being energizable by said speed selector switch when said one main winding is energized thereby to result in operation of said motor at a speed slower than when said one main winding is energized, said one main winding being energized by said line voltage when said motor is operated at high speed and being energized by a voltage less than said line voltage upon energization of said at least one main winding and said capacitor means when the motor is operated at said slower speed.

2. In a multi-speed electric motor having two or more main windings serially connected together, a multi-position speed selector switch for energization of one or more of said series connected main windings for operation of said motor at a predetermined speed corresponding to the number of said series connected main windings which are energized, a plurality of speed selector switch taps for the selective energization of a desired number of said series connected windings corresponding to a speed selected for said motor, the last of said series connected windings which when energized together with the others of said series connected main windings results in a low speed mode of operation for the motor, said motor being adapted to be connected to a source of line voltage, wherein the improvement comprises: capacitor means connected in series to one of said main windings and being energizable by said speed selector switch together with said one main winding thereby to result in operation of said motor at a speed slower than when said one main winding is energized, said one main winding being energized by said line voltage when said motor is operated at high speed and being energized by a voltage less than said line voltage upon energization of said at least one main winding and said capacitor means when the motor is operated at said slower speed.

3. In a motor as set forth in claim 2 further comprising means in parallel with said capacitor means for shunting said capacitor upon start-up of the motor thereby to increase the starting torque of the motor and for unshunting said capacitor means after start-up of the motor thereby to permit the motor to operate at said slower speed.

4. In a motor as set forth in claim 3 wherein said shunt means is a positive temperature coefficient variable resistor which has a low initial resistance and which, after energization, has a significantly higher resistance.

5. In a motor as set forth in claim 2 further comprising a bleed resistor in parallel with said capacitor means thereby to discharge said capacitor means upon de-energization of the motor.

6. In a multiple speed induction motor including a first main winding, a second main winding, said main windings being serially connected together, a multiple position speed selector switch having a movable switch element, a first tap between said first and second main windings, said movable switch element being selectively connected with said first tap for energization of said first main winding and for operation of said motor at a first speed, and a second tap on the side of said second main winding opposite said first main winding, said movable switch element being selectively connected with said second tap for the serial energization of said first and second main windings and for operation of said motor at a second speed slower than said first speed, said motor being adapted to be connected to a source of line voltage, wherein the improvement comprises: capacitor means series connected to said second main winding, a third tap on the side of said capacitor means opposite said second main winding, said movable switch element being selectively connected with said third tap for energization of both of said main windings and said capacitor means only when said movable switch element is connected to said third tap thereby to operate said motor at a speed slower than said second speed, said one main winding being energized by said line voltage when said motor is operated at high speed and being energized by a voltage less than said line voltage upon energization of said at least one main winding and said capacitor means when the motor is operated at said slower speed.

7. In a motor as set forth in claim 6 further comprising means in parallel with said capacitor means for incipiently shunting said capacitor upon start-up of the motor thereby to increase the starting torque of the motor and for unshunting said capacitor means of the motor after start-up of the motor thereby to permit the motor to operate at said slower speed.

8. In a motor as set forth in claim 7 wherein said shunt means is a positive temperature coefficient variable resistor which has a low initial resistance and which, after energization, has a significantly higher resistance.

9. In a motor as set forth in claim 7 further comprising a bleed resistor in parallel with said capacitor means thereby to discharge said capacitor upon de-energization of the motor.

10. A method of controlling the speed of an electric motor, the latter having one or more main windings, a multi-position switch for energization of said main windings thereby to permit operation of said motor at a preselected speed, said motor being adapted to be connected to a source of line voltage, wherein the method of this invention consists of the steps of:

connecting capacitor means in series with one of said main windings, selectively energizing said one main winding with said line voltage thereby to enable operation of said motor at a high speed, and selectively energizing said one main winding and said capacitor means via said switch thereby to apply a voltage across said main winding less than said line voltage and to enable operation of said motor at a speed slower than its speed when said one main winding is energized.

11. A method as set forth in claim 10 wherein said motor comprises a plurality of series connected main windings including a first set of windings and a last set of windings, said switch being operable to selectively energize one or more of said series connected windings therby to permit operation of said motor in a high speed mode when only a first of said first series connected winding is energized and to permit operation of said motor at its slow speed mode of operation when said last set of windings is energized together with the other sets of windings, said method further consisting of serially connecting said capacitor means to all of said serially connected windings thereby to permit operation of said motor at a speed slower than said slow speed mode of operation.

12. In an electric motor having a main winding, a multi-position speed selector switch for energization of the main winding thereby to permit operation of the motor at a preselected speed, said motor being adapted to be connected to a source of line voltage, wherein the improvement comprises: capacitor means connected in series to said main winding and being selectively energizable by said speed selector switch thereby to serially energize both said main winding and said capacitor means for operation of said motor at a speed slower than the operation speed of the motor when only said main winding is energized, said one main winding being energized by said line voltage when said motor is operated at high speed and being energized by a voltage less than said line voltage upon energization of said at least one main winding and said capacitor means when the motor is operated at said slower speed.

13. A method of controlling the speed of an electric motor, the latter having at least one main winding, switch means for selective energization of said one or more of said at least one main windings, said motor being adapted to be connected to a source of line voltage, wherein the method comprises the steps of:
    serially connecting capacitor means to one of said at least one main windings;
    selectively energizing said one of said at least one main windings with said line voltage thereby to enable operation of said motor at a high speed; and
    selectively energizing said one main winding and said capacitor means via said switch means thereby to apply a voltage across said main winding less than said line voltage and to result in operation of the motor at a speed slower than the motor would have operated had said capacitor means not been connected to said one of said at least one main windings.

14. In an overhead ceiling fan having a fan motor, the latter comprising a stator assembly including at least one main winding, a rotor assembly, said rotor assembly having a rotary axis adapted to extend generally vertically when the fan is in its operating position, said fan motor further having stationary means extending axially through the motor for housing a plurality of wires, said ceiling fan further having means on the lower, outboard side of said motor for securement of one or more fan blades thereto whereby said securement means together with said fan blades rotate with said rotor assembly, said stationary means extending through and out beyond said fan blade mounting means and having a switch housing mounted thereon, said switch housing having a multi-position speed selector switch therewithin and means for selective operation of said switch, said switch being electrically connected to the winding of said motor and to a source of line voltage via said plurality of wires extending axially within said stationary means, said motor being operable at a high speed mode of operation when said at least one main winding is energized by said line voltage, wherein the improvement comprises: capacitor means housed within said switch housing and electrically connected to said main winding and being selectively energizable in series with said main winding thereby to result in the application of a voltage to said at least one main winding less than said line voltage and to result in operation of said motor at a speed slower than when only said main winding is energized.

15. In an overhead ceiling fan having a fan motor, the latter comprising a stator assembly including at least one main winding, and a rotor assembly, a multiple position switch located remote from the motor and a plurality of wires extending between said switch and said stator assembly, said switch being electrically connected to said at least one main winding of the motor and to a source of line voltage, said motor being operated at a high speed mode of operation when said at least one main winding is energized by said line voltage, wherein the improvement comprises: capacitor means located remotely from said motor, said capacitor means being selectively electrically energized in series with said at least one main winding via said switch thereby to result in the application of a voltage to said at least one main winding less than said line voltage and to result in operation of said motor at a speed slower than when only said at least one main winding is energized.

* * * * *

REEXAMINATION CERTIFICATE (2164th)
United States Patent [19]
Holston et al.

[11] B1 4,408,150

[45] Certificate Issued  Dec. 28, 1993

[54] SPEED CONTROL SYSTEM AND METHOD FOR ELECTRIC MOTOR

[75] Inventors: Roger W. Holston; Carl P. Hinsley, both of St. Louis, Mo.

[73] Assignee: Emerson Electric Co., St. Louis, Mo.

Reexamination Request:
No. 90/002,087, Jul. 10, 1990

Reexamination Certificate for:
Patent No.: 4,408,150
Issued: Oct. 4, 1983
Appl. No.: 332,879
Filed: Dec. 21, 1981

Related U.S. Application Data

[63] Continuation of Ser. No. 151,679, May 20, 1980, abandoned.

[51] Int. Cl.$^5$ ................................ H02P 5/28
[52] U.S. Cl. ................................ 318/779; 318/729; 318/817; 318/438
[58] Field of Search ............ 416/5, 244; 412/423.15; 318/794, 795, 268, 66; 388/827, 833, 838, 839, 919

[56] References Cited

U.S. PATENT DOCUMENTS

| | | | |
|---|---|---|---|
| 557,957 | 4/1896 | Bradley . | |
| 850,203 | 4/1907 | Barker | 318/781 |
| 1,707,424 | 4/1929 | Bailey | 318/795 |
| 1,726,231 | 8/1929 | Kennedy | 318/779 |
| 1,783,175 | 12/1930 | Jordan . | |
| 1,844,243 | 2/1922 | Crout . | |
| 1,854,447 | 4/1932 | Chromy . | |
| 1,942,585 | 1/1934 | Wesche . | |
| 1,958,104 | 5/1934 | Kennedy . | |
| 1,978,581 | 10/1934 | Johnson | 318/817 |
| 2,033,200 | 3/1936 | Lyden . | |
| 2,057,214 | 10/1936 | Sleeter et al. | 318/795 |
| 2,084,058 | 6/1937 | Lyden . | |
| 2,091,665 | 8/1937 | Weber . | |
| 2,120,321 | 6/1938 | Bargdill | 318/794 |
| 2,388,884 | 11/1945 | Thompson . | |
| 2,395,246 | 2/1946 | Bousky . | |
| 2,648,808 | 8/1953 | Tiede | 318/510 |
| 2,667,611 | 1/1954 | Rodziano . | |
| 2,712,625 | 7/1955 | Blitz | 388/838 X |
| 3,221,237 | 11/1965 | Kalenian . | |
| 3,248,626 | 4/1966 | Landis | 388/839 |
| 3,248,631 | 4/1966 | Tolmie . | |
| 3,260,910 | 7/1966 | Spindler . | |
| 3,274,472 | 9/1966 | Slattery . | |
| 3,549,969 | 12/1970 | Yoshimura . | |
| 4,119,894 | 10/1978 | Sorensen | 318/783 |
| 4,152,630 | 5/1979 | Wanlass | 318/796 |

FOREIGN PATENT DOCUMENTS

| | | |
|---|---|---|
| 222512 | 10/1958 | Australia . |
| 646114 | 6/1937 | Fed. Rep. of Germany . |
| 462172 | 2/1951 | Italy . |
| 81695 | 12/1976 | Japan . |
| 365605 | 1/1932 | United Kingdom . |
| 1207347 | 9/1970 | United Kingdom . |

OTHER PUBLICATIONS

Fink et al, *Standard Handbook For Electrical Engineers*, 1968, McGraw-Hill, Sec. 18-137; Sec 18-147.
McGraw-Hill, Dictionary of Scientific and Technical Terms.

*Primary Examiner*—Jonathan Wysocki

[57] ABSTRACT

A speed control for an electric motor comprising a capacitor interconnected in series with the main windings of the motor and a multi-position speed selector switch for selectively energizing one or more series connected main windings of the motor and, in a slow speed mode of operation, for serially connecting the capacitor to the series connected main windings so that the motor operates at a slower speed.

A method of speed control for an electric motor is also disclosed.

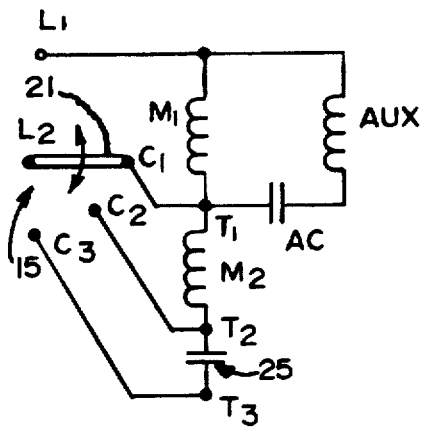

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 9-13, 14-40:

This invention relates to an induction electric motor, and more specifically to a means and a method which may be readily used with the motor so as to result in operation of the motor at a speed slower than its normal [of] operational speed.

In such applications as in a ceiling-mounted fan or the like, a single or multi-speed motor is typically provided for driving the fan. However, in many instances, it would be desirable to provide another speed of operation for the fan motor even slower than its normal low speed mode of operation. Typically, this is accomplished by replacing a single speed motor with a multi-speed motor, or by replacing a two-speed motor with a three-speed motor. These multi-speed motors oftentimes have different sets of main windings each having different number of poles in each set of windings which may be energized for high, low, or intermediate speed operation. For example, a two-speed motor may be provided having a low speed set of windings including [a] four poles and a high speed set of windings including two poles. Typically, a selector switch is connected to the lead wires to the motor windings for selective energization for either the high speed or low speed poles of the motor. Of course, it will be appreciated that by providing additional sets of windings or by selective energization of the various coils in the windings, many more speeds of operation of the motor may result. However, it is usually more expensive to provide an additional set of windings in the motor as these additional windings require more materials to construct, take up more space within the motor, and are more difficult to insert in the stator core of the motor.

Column 1, lines 48-67 to column 2, lines 1-2:

Alternatively, another method of speed control is to place an inductance in series with the main windings of the motor so that with the load current flowing through the main windings and the inductance the inductance will cause the motor to operate at a slower speed. Such a voltage reduction speed control is shown in U.S. Pat. No. 850,203. However, while such a voltage controlling speed control may be relatively simple, and may be "added on" to the motor, it results in significant heat losses. Also, such a voltage reduction speed controller means that when the inductance is connected to the main windings, the motor may not have sufficient starting torque. As is disclosed *in* above-noted U.S. Pat. No. 850,203, a centrifugally responsive switch may be provided to disconnect the resistance from the winding during start-up and to reconnect the resistance to the windings only after the motor has accelerated to a predetermined speed. However, in many motor applications, there may not be sufficient space within the motor to use the centrifugal switch approach and the centrifugal switch adds to the complexity and the cost of the motor.

Column 2, lines 10-12:

The provision of such a speed control means [switch] *which* may be "added on" to the motor wiring externally of the motor;

Column 4, lines 10-42, 43-53:

Referring now to FIG. 3, another embodiment of the apparatus of the present invention is illustrated. In essence, the construction of motor 1 and the speed control means of the present invention incorporating capacitor 25 is essentially identical as disclosed above. However, a variable resistance incipient shunt 27 is connected in parallel with capacitor 25 between tap $T_2$ and $T_3$. This shunt resistance is shown to be a positive temperature coefficient resistor, preferably a thermistor. With movable switch element 21 of switch 15 in contact with contact $C_3$ and with the motor initially de-energized, the resistance of shunt resistor 27 will initially be quite low thereby to essentially shunt capacitor 25 from the circuit. Initially, substantially all of the line current will flow through main windings $M_1$ and $M_2$ and through the shunt resistor. Thus, the motor will start as if capacitor 25 were not in the circuit. This ensures that capacitor 25 does not adversely affect the starting torque characteristics of the motor. After the passage of a small increment of time during which time the motor accelerates to a desired speed, the positive temperature coefficient shunt resistor 27 self heats due to the flow of current therethrough and substantially increases its resistance to the flow of current therethrough. In its normal energized state, shunt resistor 27 has a relatively high resistance value and thus has little or no effect on capacitor 25. Thus, capacitor [C,] *25* after initial energization of the motor, will control the speed of operation of the m...or to its intended slow speed mode of operation. It will further be appreciated that upon shunt-down of the motor and upon cooling of thermistor 27, the thermistor will act as a bleed resistor so as to discharge capacitor 25 when the motor is not in operation.

Referring now to FIG. 4, still another variation of the speed control system of the present invention is illustrated. Again, motor 1 is essentially the same as heretofore described with capacitor 25 serially connected to the low speed windings $M_2$. However, in place of the shunt resistor 27 described in regard to the *embodiment of* FIG. 3, a bleed resistor, as indicated at 29, is connected in parallel to capacitor 25. In operation, bleed resistor 29 has little or no effect on the operating speed of the motor, but upon shut-down of the motor, the bleed resistor will allow the charge on capacitor 25 to dissipate.

Column 4, lines 63-68 to Column 5, lines 1-11:

For example, in a one/twenty-fifth horsepower permanent split capacitor [18 pole,] *eighteen pole motor*, a five microfarad capacitor 25 was connected in series with the [low speed winding $M_2$,] *windings $M_1$, and $M_2$,* such as illustrated in FIG. 4. Bleed resistor 29 was specified to have a value of approximately 220,000 ohms. When connected to suitable source of electric power, the motor had a high speed mode of operation of approximately 170 RPM. Upon moving the speed selector switch movable element 21 to contact C₂ for energization of both the high and low speed windings M₁ and M₂, the motor had an operational speed of approximately 125 RPM. When speed selector switch movable element 21 was moved to contact C₃ thereby to energize the serially connected main windings and speed control capacitor 25, the motor was obserbed to have a low speed mode of operation of approximately 40 to 50 RPMs.

AS A RESULT OF REEXAMINATION, IT HAS BEEN DETERMINED THAT:

The patentability of claims 14 and 15 is confirmed.

Claims 1, 2, 6, 10, 12 and 13 are determined to be patentable as amended.

Claims 3–5, 7–9 and 11, dependent on an amended claim, are determined to be patentable.

New claims 16–36 are added and determined to be patentable.

1. In [an] *a ceiling fan permanent-split capacitor* electric motor having at least one main winding, a multi-position speed selector switch for energization of the main winding [of] *for* operation of the motor at high speed and one or more slower speeds, said motor being adapted to be connected to a source of line voltage, wherein the improvement comprises: capacitor means *for producing a slower speed of said motor in a range of less than approximately 125 RPM and greater than approximately 40 RPM, said capacitor means being* connected in series with one of said at least one main windings and being energizable by said speed selector switch when said one main winding is energized thereby to result in operation of said motor *within said slower speed range and* at a speed slower than when said one main winding is energized, said one main winding being energized by said line voltage when said motor is operated at high speed and being energized by a voltage less than said line voltage upon energization of said at least one main winding and said capacitor means when the motor is operated [at] *within* said slower speed *range*.

2. In a multi-speed *ceiling fan* electric motor having two or more main windings serially connected together, a multi-position speed selector switch for energization of one or more of said series connected main windings for operation of said motor at a predetermined speed corresponding to the number of said series connected main windings which are energized, a plurality of speed selector switch taps for the selective energization of a desired number of said series connected windings corresponding to a speed selected for said motor, the last of said series connected windings which when energized together with the others of said series connected main windings results in a low speed mode of operation for the motor, said motor being adapted to be connected to a source of line voltage, wherein the improvement comprises: capacitor means *for producing a slower speed of said motor in a range of less than approximately 125 RPM and greater than approximately 40 RPM, said capacitor means being* connected in series to one of said main windings and being energizable by said speed selector switch together with said one main winding thereby to result in operation of said motor at a speed *within said range and* slower than when said one main winding is energized, said one main winding being energized by said line voltage when said motor is operated at high speed and being energized by a voltage less than said line voltage upon energization of said at least one main winding and said capacitor means when the motor is operated [at] *within* said slower speed *range*.

6. In a multiple speed *ceiling fan* induction motor including a first main winding, a second main winding, said main windings being serially connected together, a multiple position speed selector switch having a movable switch element, a first tap between said first and second main windings, said movable switch element being selectively connected with said first tap for energization of said first main winding and for operation of said motor at a first speed, and a second tap on the side of said second main winding opposite said first main winding, said movable switch element being selectively connected with said second tap for the serial energization of said first and second main windings and for operation of said motor at a second speed slower than said first speed, said motor being adapted to be connected to a source of line voltage, wherein the improvement comprises: capacitor means *for producing a slower speed of said motor in a range of less than approximately 125 RPM and greater than approximately 40 RPM, all motor speeds within said range being slower than said second speed, said capacitor means being* series connected to said second main winding, a third tap on the side of said capacitor means opposite said second main winding, said movable switch element being selectively connected with said third tap for energization of both of said main windings and said capacitor means only when said movable switch element is connected to said third tap thereby to operate said motor [at a speed slower than] *within said range of speeds below* said second speed, said one main winding being energized by said line voltage when said motor is operated at high speed and being energized by a voltage less than said line voltage upon energization of said at least one main winding and said capacitor means when the motor is operated [at said slower speed] *within said range of speeds*.

10. A method of controlling the speed of [an] *a ceiling fan* electric motor, the latter having one or more main windings, a multi-position switch for energization of said main windings thereby to permit operation of said motor at a preselected speed, said motor being adapted to be connected to a source of line voltage, wherein the method of this invention consists of the steps of:
  connecting capacitor means in series with one of said main windings,
  selectively energizing said one main winding with said line voltage thereby to enable operation of said motor at a high speed, and
  selectively energizing said one main winding and said capacitor means via said switch thereby to apply a voltage across said main winding less than said line voltage and to enable operation of said motor at a speed *of less than approximately 125 RPM and greater than approximately 40 RPM which is* slower than its speed when said one main winding is energized.

12. In [an] *a ceiling fan* electric motor having a main winding, a multi-position speed selector switch for energization of the main winding thereby to permit operation of the motor at a preselected speed, said motor being adapted to be connected to a source of line voltage, wherein the improvement comprises: capacitor means *for operation of said motor at a slow speed in a range of less than approximately 125 RPM and greater than approximately 40 RPM*, said capacitor means being connected in series to said main winding and being selectively energizable by said speed selector switch thereby to serially energize both said main winding and said capacitor means for operation of said motor at [a] *said slow* speed slower than the operation speed of the motor when only said main winding is energized, said one main winding being energized by said line voltage when said motor is operated at high speed and being energized by a voltage less than said line voltage upon energization of said at least one main winding and said capacitor means when the motor is operated at said [slower] *slow* speed.

13. A method of controlling the speed of an electric motor *in a ceiling fan*, the latter having at least one main winding, switch means for selective energization of said one or more of said at least one main windings, said motor being adapted to be connected to a source of line voltage, wherein the method comprises the steps of:

serially connecting capacitor means to one of said at least one main windings;

selectively energizing said one of said at least one main windings with said line voltage thereby to enable operation of said motor at a high speed; and selectively energizing said one main winding and said capacitor means via said switch means thereby to apply a voltage across said main winding less than said line voltage and to result in operation of the motor at a speed *of less than approximately 125 RPM and greater than approximately 40 RPM* which is slower than the motor would have operated had said capacitor means not been connected to said one of said at least one main windings.

16. An overhead ceiling fan as set forth in claim 15 wherein said fan motor includes an eighteen pole stator assembly and wherein said capacitor means includes an approximately five microfarad capacitor.

17. An overhead ceiling fan as set forth in claim 15 wherein said capacitor means includes an approximately five microfarad capacitor.

18. An overhead ceiling fan as set forth in claim 15 wherein said slower speed being less than approximately 125 RPM and greater than approximately 40 RPM.

19. An overhead ceiling fan as set forth in claim 15 wherein said motor is a permanent-split capacitor motor having an auxiliary winding in series with a run capacitor and said auxiliary winding and said run capacitor are connected in parallel with said at least one main winding.

20. An overhead ceiling fan comprising a permanent-split capacitor electric motor, said motor having a stator having windings including a main winding and an auxiliary winding, a run capacitor connected in series with said auxiliary winding, said auxiliary winding and said run capacitor being connected in parallel with said main winding, said motor further having a rotor, said rotor having a hollow rotor shaft extending exteriorly of said motor, means rotatable with said rotor shaft for mounting fan blades thereon, a wire raceway within said rotor shaft, a plurality of lead wires connected to said windings for supplying line voltage thereto so as to result in high speed operation of said motor, said lead wires extending exteriorly of said motor within said wire raceway, a switch housing carried by said wire raceway, a selectively operable switch within said switch housing connected to said lead wires for controlling operation of said motor, and capacitor means located within said switch housing and connected to said switch for selective energization in series with said windings thereby to result in the application of a voltage to said main winding less than said line voltage and to result in operation of said motor at a speed slower than when said line voltage is applied to said windings.

21. An overhead ceiling fan comprising a permanent-split capacitor electric motor, the latter having a stator having windings including at least one main winding and an auxiliary winding, a run capacitor connected in series with said auxiliary winding, said run capacitor and said auxiliary winding connected in parallel with said at least one main winding a plurality of lead wires connected to said main and auxiliary windings for supplying line voltage to said windings thereby to result in high speed operation of said motor, said lead wires extending exteriorly of said motor, a selectively actuatable switch remote from said motor connected to said lead wires for selectively controlling operation of said motor, capacitor means located remotely from said motor, said capacitor means via said switch and said lead wires being selectively energized in series with said windings thereby to result in the application of voltage to said windings less than said line voltage and to result in operation of said motor at a speed slower than when said windings are energized by said line voltage.

22. A ceiling fan motor speed control comprising a permanent-split capacitor electric motor having a stator and rotor, said stator having windings including a main winding and an auxiliary winding, a run capacitor connected in series with said auxiliary winding, said run capacitor and said auxiliary winding being connected in parallel with said main winding, a plurality of lead wires extending exteriorly of said motor for connecting said windings to a source of electrical power, a selectively operable switch connected to said lead wires remote from said motor for controlling operation of said motor, and capacitor means remote from said motor connected to said switch such that upon actuation of said switch to a first position, line voltage is applied to said main winding such that said motor operates in a high speed mode of operation, and upon actuation of said switch to a second position said capacitor means is connected in series with said windings thereby to result in the application of a voltage to said main winding less than the line voltage of said electrical power source thereby to result in operation of said motor at a speed slower than when said line voltage is applied to said main winding.

23. A ceiling fan speed control as set forth in claim 22 wherein said slower speed being less than approximately 125 RPM and greater than approximately 40 RPM.

24. A ceiling fan speed control as set forth in claim 22 wherein said capacitor means includes an approximately five microfarad capacitor and said motor includes approximately eighteen poles.

25. A ceiling fan speed control as set forth in claim 22 wherein said high speed mode operation is approximately 170 RPM.

26. A speed controlled ceiling fan including a motor assembly enclosed within a housing, said motor assembly including a stator and a rotor, said rotor turning with respect to said stator about a vertical axis, said rotor extending downwardly and carrying a plurality of fan blades thereupon for direct-drive rotation about the vertical axis, said stator including a main motor winding, a vertical stationary hollow wire raceway adapted to provide shielded delivery of electrical wires to said stator within said motor housing, a speed selector switch in electrical communication with said electrical wires and located exteriorly of said motor housing, capacitor means electrically connected to said switch for selective electrical communication in series with said main winding, said capacitor means being located exteriorly of said motor housing, said rotation of said fan blades being at a high speed when said capacitor means is not in electrical communication with said main winding and said rotation of said fan blades being at a lower speed when said capacitor means is switched to be in series electrical communication with said main winding.

27. A speed controlled ceiling fan as set forth in claim 26 wherein said stator includes within said housing an auxiliary winding means including an auxiliary winding connected in series with a run capacitor, said auxiliary means connected in parallel with said main winding, and said capacitor means being selectively connected in series to the combination of said main winding and said auxiliary means by said switch.

28. A speed controlled ceiling fan as set forth in claim 26 wherein said lower speed being less than approximately 125 RPM and greater than approximately 40 RPM.

29. A speed controlled ceiling fan as set forth in claim 26 wherein said high speed is approximately 170 RPM.

30. A speed controlled ceiling fan as set forth in claim 26 wherein said capacitor means includes an approximately five microfarad capacitor and wherein said motor is an eighteen pole motor.

31. In a ceiling fan including a motor, said motor having a stator and a rotor, said rotor being rotatably mounted with respect to said stator, a plurality of fan blades operatively connected to said rotor for rotation therewith, said stator including a main motor winding, and a speed selector switch electrically connected between at least said main winding and a source of electrical power, the improvement which comprises a ceiling fan speed control, said ceiling fan speed control comprising a capacitor electrically connected to said speed selector switch for selective connection in series with said main motor winding, said main motor winding including a plurality of poles, said capacitor having a fixed value selected according to the number of said poles such that said rotor rotates at a speed between a range of approximately 40 revolutions per minute and 125 revolutions per minute when said capacitor is serially electrically connected to said main winding.

32. In combination, a ceiling fan including a motor, said motor having a stator and a rotor, said rotor being rotatably mounted with respect to said stator, a plurality of fan blades operatively connected to said rotor for rotation therewith, said stator including a main motor winding, a speed selector switch electrically connected between at least said main winding and a source of electrical power, and ceiling fan speed control means for providing a high speed above 125 RPM and a low speed between about 40 RPM and 125 RPM, the ceiling fan speed control means comprising capacitor means electrically connected to said speed selector switch for selective connection in series connection with said main motor winding, said capacitor means having a fixed value selected for a particular motor such that said rotor rotates at said low speed when said capacitor means is serially electrically connected to said main winding.

33. In an overhead ceiling fan having an eighteen pole fan motor, the latter comprising a stator assembly including at least one main winding, a rotor assembly, said rotor assembly having a rotary axis adapted to extend generally vertically when the fan is in its operating position, said fan motor further having stationary means extending axially through the motor for housing a plurality of wires, said ceiling fan further having means on the lower, outboard side of said motor for securement of one or more fan blades thereto whereby said securement means together with said fan blades rotate with said rotor assembly, said stationary means extending through and out beyond said fan blade mounting means and having a switch housing mounted thereon, said switch housing having a multi-position speed selector switch therewithin and means for selective operation of said switch, said switch being electrically connected to the winding of said motor and to a source of line voltage via said plurality of wires extending axially within said stationary means, said motor being operable at a high speed mode of operation when said at least one main winding is energized by said line voltage, wherein the improvement comprises: capacitor means having a capacitance value of approximately five microfarads housed within said switch housing and electrically connected to said main winding thereby to result in the application of a voltage to said at least one main winding less than said line voltage and to result in opertion of said motor at a speed slower than when only said main winding is energized.

34. In an overhead ceiling fan having an eighteen pole fan motor, the latter comprising a stator assembly including at least one main winding, and a rotor assembly, a multiple position switch located remote from the motor and a plurality of wires extending between said switch and said stator assembly, said switch being electrically connected to said at least one main winding of the motor and to a source of line voltage, said motor being operated at a high speed mode of opertion when said at least one main winding is energized by said line voltage, wherein the improvement comprises: capacitor means having a capacitance value of approximately five microfarads located remotely from said motor, said capacitor means being selectively electrically energized in series with said at least one main winding via said switch thereby to result in the application of a voltage to said at least one main winding less than said line voltage and to result in operation of said motor at a speed slower than when only said at least one main winding is energized.

35. In combination, a ceiling fan including a motor, said motor having a stator and a rotor, said rotor being rotatably mounted with respect to said stator, a plurality of fan blades operatively connected to said rotor for rotation therewith, said stator including a main motor winding having eight n poles, a speed selector switch electrically connected between at least said main winding and a source of electrical power, and ceiling fan speed control means for providing a high speed above 125 RPM and a low speed between about 40 RPM and 125 RPM, the ceiling fan speed control means comprising capacitor means electrically connected to said speed selector switch for selective connection in series connection with said main motor winding, said capacitor means having a fixed value of approximately five microfarads, such that said rotor rotates at said low speed when said capacitor means is serially electrically connected to said main winding.

36. In combination, a ceiling fan including a motor, said motor having a stator and a rotor, said rotor being rotatably mounted with respect to said stator, a plurality of fan blades operatively connected to said rotor for rotation therewith, said stator including a main motor winding, a speed selector switch electrically connected between at least said main winding and a source of electrical power, and ceiling fan speed control means for providing a normal high speed, the ceiling fan speed control means comprising capacitor means electrically connected to said speed selector switch for selective connection in series connection with said main motor winding, said capacitor means having a capacitance value, such that said rotor rotates at a low speed when said capacitor means is serially electrically connected to said main winding, said low speed being at least 60% less than said normal high speed.

* * * * *

REEXAMINATION CERTIFICATE (3078th)

United States Patent [19]

Holston et al.

[11] B2 4,408,150

[45] Certificate Issued  Dec. 17, 1996

[54] SPEED CONTROL SYSTEM AND METHOD FOR ELECTRIC MOTOR

[75] Inventors: Roger W. Holston; Carl P. Hinsley, both of St. Louis, Mo.

[73] Assignee: Heller Financial, Inc.

Reexamination Request:
No. 90/003,948, Sep. 11, 1995

Reexamination Certificate for:
Patent No.: 4,408,150
Issued: Oct. 4, 1983
Appl. No.: 332,879
Filed: Dec. 21, 1981

Reexamination Certificate B1 4,408,150 issued Dec. 28, 1993

Related U.S. Application Data

[63] Continuation of Ser. No. 151,679, May 20, 1980, abandoned.

[51] Int. Cl.$^6$ .................................................. H02P 5/28
[52] U.S. Cl. .................. 318/779; 318/729; 318/817; 318/438
[58] Field of Search ......................... 318/794, 779, 318/795, 772, 268, 782, 66, 783, 775–777, 816, 817; 388/827, 833, 838, 839, 919; 310/184, 189; 416/101, 106

[56] References Cited

U.S. PATENT DOCUMENTS

| 4,006,937 | 1/1978 | Pfarrer et al. ............ 318/795 X |
| 4,119,894 | 10/1978 | Sorenson . | |

FOREIGN PATENT DOCUMENTS

| 222512 | 4/1958 | Australia . |
|---|---|---|
| 0181072 | of 1986 | European Pat. Off. . |
| 630785 | 9/1936 | Germany . |
| 710979 | 9/1938 | Germany . |
| 2104371 | of 1972 | Germany . |
| 63651 | 9/1959 | India . |
| 50-125713 | of 1975 | Japan . |
| 81695 | 12/1976 | Japan . |
| 362509 | 12/1931 | United Kingdom . |
| 380459 | 9/1932 | United Kingdom . |
| 1045253 | 10/1966 | United Kingdom . |
| 1207347 | 11/1967 | United Kingdom . |
| 2105931 | of 1983 | United Kingdom . |

OTHER PUBLICATIONS

Barker Declaration, dated Feb. 15, 1991.
Holston Affidavit, dated Nov. 16, 1981.
Fink et al., *Standard Handbook For Electrical Engineers*, 1968, McGraw–Hill, section 18–37, section 18–147.
McGraw–Hill, Inc., *Dictionary of Scientific & Technical Terms*, Scientific Library Date, Mar. 29, 1967.

*Primary Examiner*—Jonathan Wysocki

[57] ABSTRACT

A speed control for an electric motor comprising a capacitor interconnected in series with the main windings of the motor and a multi-position speed selector switch for selectively energizing one or more series connected main windings of the motor and, in a slow speed mode of operation, for serially connecting the capacitor to the series connected main windings so that the motor operates at a slower speed.

A method of speed control for an electric motor is also disclosed.

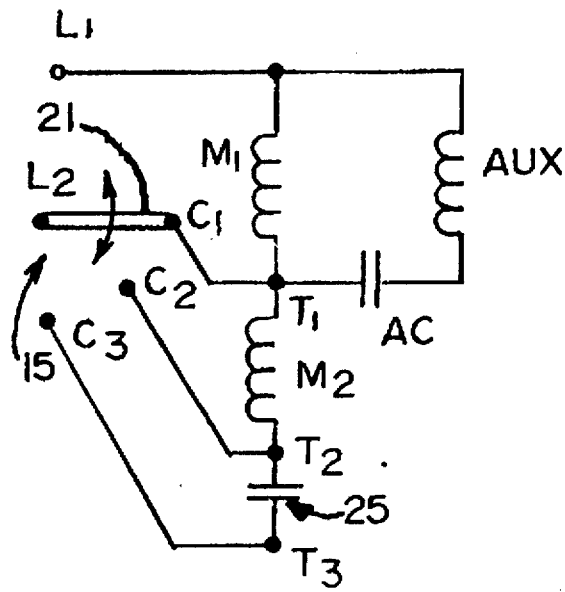

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 to 36 is confirmed.

* * * * *